June 20, 1933.  E. S. MacPHERSON  1,914,516

WRIST PIN CONNECTION

Filed March 31, 1930

INVENTOR
Earle S. MacPherson
BY Whittemore Hulbert
Whittemore & Belknap

ATTORNEYS

Patented June 20, 1933

1,914,516

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

WRIST PIN CONNECTION

Application filed March 31, 1930. Serial No. 440,475.

This invention relates to internal combustion engines and more particularly to improvements in piston assemblies.

One of the principal objects of this invention is to provide means for securing a wrist pin in assembled relation with a piston in such a manner that distortion of the piston walls by the securing means is prevented.

With the foregoing as well as other objects in view, the invention resides in the details of construction which will be made more apparent as this description proceeds, especially when considered in connection with the accompanying drawing, wherein.

Figure 1:
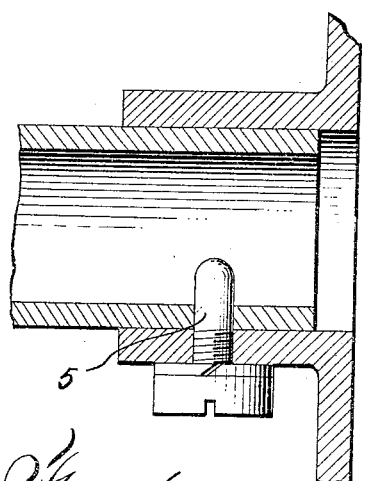
Figure 1 is a fragmentary sectional view through a piston assembly illustrating one method of securing a wrist pin to a piston utilized in numerous internal combustion engines as now commercially produced.

Heretofore in assembling wrist pins with pistons it has been generally the practice to clamp the lower portions of the wrist pins to corresponding portions of the piston bosses by securing elements having shank portions threadedly engaging one of the portions aforesaid of the bosses and extending through the other of said portions as clearly illustrated in Figure 1. In assembling wrist pins, in the manner outlined above extreme care must be taken in fashioning the opening in the wrist pin and the portion 5 of the bolt so that the latter snugly engages the side walls of the opening and at the same time permits sliding movement of the bolt within the opening. For example, if too much clearance exists between the bolt and opening, the pin will be permitted to move longitudinally relative to the piston which is obviously objectionable. On the other hand, if the portion 5 fits the opening too snugly, a wedging action takes place between the lower portions of the boss and pin with the result that the latter tend to separate and thereby distort the piston walls.

Figure 2:
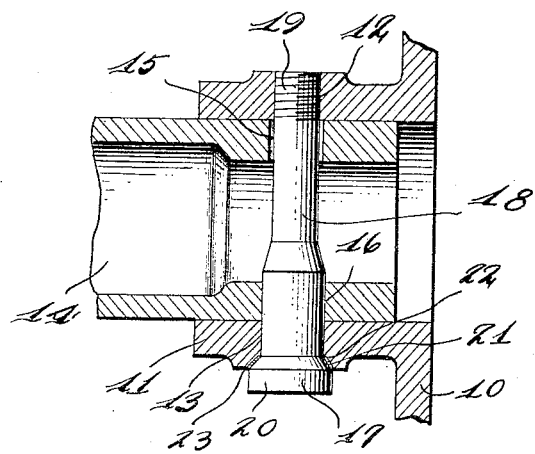
Figure 2 is a cross-sectional view through a piston having a wrist pin secured thereto in accordance with my invention.
Figure 3:
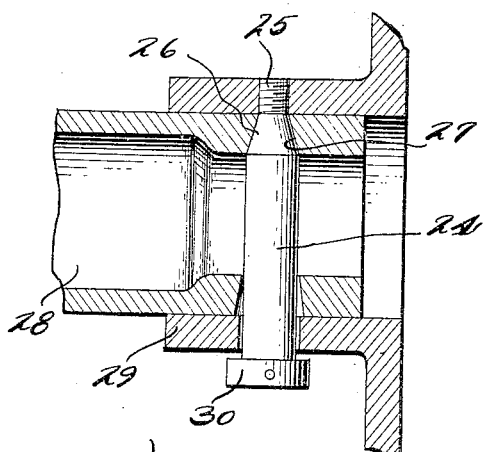
Figures 3 and 4 are views similar to Figure 2 showing modified forms of the invention.
Figure 4:
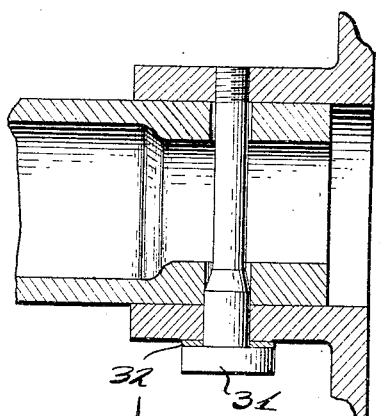

The present invention, as set forth in the preceding description, contemplates eliminating the above objections by several different constructions illustrated in Figures 2 to 4, inclusive. As shown in Figure 2, the piston 10 is provided with an inwardly extending tubular boss 11 having aligned openings 12 and 13 in the upper and lower walls, respectively, thereof. Sleeved within the tubular boss 11 is a wrist pin 14 having openings 15 and 16 in the upper and lower walls thereof registering respectively with the openings 12 and 13 in the piston boss. The wrist pin 14 is secured within the piston boss by means of a fastener element 17 which is in the form of a bolt having a shank portion 18 extending through the aligned openings aforesaid and having the upper end threaded as at 19 to threadedly engage the opening 12 in the upper wall of the boss. The bolt 17 is further provided with a head portion 20 having a conical face 21 adapted, in assembled relation of the parts, to engage a conical seat 22 formed in the lower wall 13 of the boss and surrounding the opening 13. By reason of this latter construction, the bolt is rigidly clamped in position and is prevented from lateral movements relative to the piston boss. The bolt is preferably locked in place by means of a suitable lock washer 23 disposed between the conical surfaces 21 and 22 and conforming to the shape of the latter. As will be apparent from Figure 2, the portion of the bolt adjacent the head 20 is preferably of such diameter as to slidably engage the side walls of the openings 13 and 16 while the remaining portion is of reduced diameter to provide a clearance between the side walls of the opening 15 and the shank of the bolt. The construction is such as to permit slight angular movements of the shank 18 during the fastening operation to facilitate aligning the threads 19 with the opening 12.

In Figure 3 of the drawing I have shown a slightly modified form of construction distinguished from the one hereinbefore described in that the shank of the bolt 24 adjacent the threaded portion 25 is provided with a conical surface 26 adapted to engage a conical seat 27 formed by tapering the side walls of the opening in the upper portion of the wrist pin 28. The direction of taper is such that in the assembled relation of the parts the upper portions of the wrist pin are clamped into engagement with the upper part of the piston boss 29. If desired, the enlarged portion of the bolt designated by the reference character 30 may be of such diameter as to provide a slight clearance between the aligned openings in the lower portions of the wrist pin and piston boss so as to permit slight angular movements of the bolt 24 during the assembling operation.

The modification illustrated in Figure 4 is substantially identical to the construction illustrated in Figure 2 with the exception that the cooperating conical surfaces on the boss and bolt, shown in Figure 2, are eliminated. As shown in Figure 4, the shank of the bolt extends through the aligned openings in the piston boss and wrist pin and is provided with a threaded portion at the upper end thereof threadedly engaging the opening in the upper wall of the boss. The lower end of the bolt is provided with a head portion 31 adapted to be clamped to the bottom wall of the boss through the medium of the lock washer 32.

From the foregoing it will be observed that I have provided various means for securing wrist pins to pistons which permit the latter members to be assembled with facility and which holds the upper portions of the wrist pin to the adjacent portions of the piston boss in such a manner as to resist separation of the latter portions and thereby prevent distorton of the piston walls.

While several embodiments of the invention have been set forth herein somewhat in detail, it should be understood that various other modifications may be resorted to for accomplishing the desired results without departing from the spirt and scope of this invention and accordingly reservation is made to make such changes as may come within the purview of the accompanying claims.

What I claim as my invention is:

1. A piston having a tubular boss formed with aligned openings in opposite side walls thereof, a wrist pin substantially tubular in cross section sleeved within the boss and having openings opposite walls thereof registering with the openings aforesaid, a headed fastener element having a shank portion extending through the said openings, said shank portion projecting freely through the openings in the wrist pin and threadedly engaging the opening in said boss opposite the head of the fastener element.

2. A piston having a boss formed with aligned openings in the upper and lower walls thereof, a wrist pin sleeved within the boss having aligned openings in opposite walls thereof registering with the openings in said boss, and a fastener element having a shank slidably engaging the openings in the lower walls of said boss and wrist pin and having a reduced portion extending through the opening in the upper wall of said wrist pin in spaced relation thereto, said shank terminating in a threaded portion threadedly engaging the opening in the upper wall of said boss.

3. A piston having a boss formed with aligned openings in the upper and lower walls thereof, a wrist pin sleeved within the boss and having openings in the upper and lower walls thereof registering with the openings aforesaid, a fastener element having a shank portion extending through the said openings and threadedly engaging the opening in the upper wall of said boss, said fastener element further having a head portion provided with a conical surface adapted to engage a conical seat surrounding the opening in the lower wall of said boss and cooperating with the threaded portion aforesaid to clamp the upper portion of said boss and pin together.

4. A piston having a tubular boss formed with aligned openings in the upper and lower walls thereof, a wrist pin substantially tubular in cross section sleeved within the boss and having openings in the upper and lower walls thereof registering with the openings aforesaid, and a fastener element having a head portion engaging the lower wall of the boss and having a shank portion extending through the openings aforesaid, said shank portion extending freely through the openings in said wrist pin and threadedly engaging the opening in the upper wall of the boss, whereby tightening of said element clamps the upper and lower portions of the boss to the adjacent portions of the pin.

5. A piston having a tubular boss formed with aligned openings in the upper and lower walls thereof, a wrist pin sleeved within the boss having aligned openings in opposite walls thereof registering with the openings in the boss, and a fastener element having a shank fashioned to extend freely through the openings in the lower walls of the boss and wrist pin and provided with a reduced portion extending freely through the opening in the upper wall of said wrist pin and anchored to the adjacent wall of the boss.

6. A piston having a tubular boss formed with aligned openings in the upper and lower walls thereof, a wrist pin sleeved within the boss and having aligned openings in opposite walls registering with the openings aforesaid in the boss, and a fastener element having a head engaging the lower wall of the boss and having a reduced shank portion extending through the aligned openings aforesaid in the boss and wrist pin and having a threaded portion threadedly engaging the opening in the upper wall of the boss.

7. A piston having a tubular boss, a wrist pin tubular in cross section sleeved within the boss and having aligned openings in opposite walls thereof registering with corresponding openings in the boss, a fastener element having a shank extending freely through the openings in the lower walls of the boss and wrist pin and having a portion extending through the opening in the upper wall of the wrist pin provided with a threaded extension for threadedly engaging the side walls of the opening in the upper wall of the boss, and means on said fastener element cooperating with the threaded engagement aforesaid for clamping the upper portions of the boss and pin together.

In testimony whereof I affix my signature.

EARLE S. MacPHERSON.